United States Patent Office 3,563,691
Patented Feb. 16, 1971

3,563,691
PROCESS FOR PRODUCING A DEAE CELLULOSIC FABRIC WHICH INCORPORATES REVERSIBLE CROSS-LINKS
Truman L. Ward and Ruth R. Benerito, New Orleans, and Donald M. Soignet, Metairie, La., assignors to the United States of America as represented by the Secretary of Agriculture
No Drawing. Filed Apr. 25, 1969, Ser. No. 819,440
Int. Cl. D06m 13/08, 13/28
U.S. Cl. 8—120                                          4 Claims

ABSTRACT OF THE DISCLOSURE

Fabrics composed of diethylaminoethylated cellulosic fibers are reacted with halogenated epithiopropanes. The modified fabrics may be cross-linked by treatment with an oxidizing agent. The cross-linkages may be broken by treating the fabric with a reducing agent.

---

A nonexclusive, irrevocable, royalty-free license in the invention herein described, throughout the world for all purposes of the United States Government, with the power to grant sub-licenses for such purposes, is hereby granted to the Government of the United States of America.

An object of this invention is to prepare at will diethylaminoethyl cellulosic fabric containing sulfhydryl groups. A further object of this invention relates to the control of cross-linking cellulosic chains by oxidizing the sulfhydryl groups to form the cross-links and a subsequent reduction of the sulfhydryl groups to break the cross-links.

The oxidation of sulfhydryl groups and their subsequent reduction is known in the prior art. Schwenker [Textile Res. J., 33, 107 (1963)] formed and broke disulfide cross-links where the sulfhydryl groups were attached directly to the cellulosic chain rather than on a pendant group. Hobart and Mack [Textile Res. J., 36, 30 (1966)] formed and broke disulfide cross-links where the sulfhydryl groups were attached to dialdehyde cotton. However, no mention of the reaction of 1–Cl 2,3-epithiopropane with the diethylaminoethyl ether of cellulose to achieve the addition has been found. 1–Cl 2,3-epithiopropane does not react with cellulose which has not been diethylaminoethylated. While epichlorohydrin, the oxygen analogue of 1–Cl 2,3-epithiopropane, add to cellulose under similar (base catalyzed) conditions, unmodified cellulose is not capable of adding sulfur.

By the process of this invention, cellulosic material which has been treated with an aqueous solution of β-chloroethyldiethylamine hydrochloride to form the diethylaminoethyl ether of cellulose is reacted with 1–Cl 2,3-epithiopropane under base conditions to add the sulfhydryl groups. The cellulose chains to which the sulfhydryl groups are attached may be cross-linked by oxidation of the sulfhydryl groups which cross-linking increases crease retention of the fabric. The cross-links may be broken by reduction.

In preparing the composition of new matter by the instant invention, cellulosic fabric is pretreated with an aqueous solution of β-chlorodiethylamine hydrochloride, dried and immersed overnight in a 25% aqueous solution of sodium hydroxide, washed in dilute acetic acid to remove the excess sodium hydroxide, washed in water and dried. The diethylaminethyl ether of cellulose is then reacted with 1–Cl 2,3-epithiopropane under basic conditions, at a temperature between 26° C. and the reflux temperature of the reaction mixture for a period of time depending upon the temperature of the reaction. The basic reaction conditions are necessary to secure a maximum of normal ring opening and consequent high sulfur content.

Use of prepadding with NaOH of a DEAE cotton and subsequent reaction with episulfide in a hindered alcohol increases addition of sulfhydryl groups and keeps addition of chlorine to a minimum.

The episulfide may be either prepared separately or in situ. Use of either t-pentyl or n-octyl alcohol increases the amount of sulfur added by about threefold and decreases the amount of chlorine added. The resultant product is a suitable precursor for subsequent reactions involving the SH groups.

The diethylaminethyl cellulose fabric to which sulfhydryl groups have been introduced can undergo controlled cross-linking by oxidizing the sulfhydryl groups for cross-linking and reducing the oxidized groups to break the cross-links. Weak oxidizing solutions such as $KBrO_3$ in water can suitably be employed in the present process to form the cross-links and substantially any weak reducing solution such as ammonium thioglycolate in water can suitably be employed to break the cross-links.

The amount of cross-linking between the cellulosic chains through the sulfhydryl groups is controlled by the reaction time in the oxidizing or reducing solution. The greater the reaction time in the oxidizing solution, the greater the number of cross-links formed. The longer the reaction time in the reducing solution, the greater the number of cross-links broken. More cross-links increase the crease retention as measured by crease angle determination, and conversely less cross-links decrease the crease retention of the cellulosic fabric.

Substantially any fabric containing cellulosic material with hydroxyl groups to which diethylaminoethyl groups have been attached through an ether linkage may be employed in the process of this invention. Illustrative examples of such material include those from cotton, flax, ramie, wood, viscose rayon, partial esters of these materials, partial ethers of these materials, partially acetylated cellulose, partially cyanoethylated cellulose, partially aminoethylated cellulose, and partially carboxymethylated cellulose. The cellulosic textile fibers in the form of fabric or objects made of fabric, are particularly suuitable starting material.

In carrying out the preferred process of this invention, the oxidation and reduction steps are best carried out in weak solution so as to avoid undesirable side reaction.

The following examples illustrate but do not limit the scope of this invention.

EXAMPLE 1

Approximately 10 g. of 80 x 80 cotton printcloth, desized, scoured, and bleached was impregnated in a 10% solution of β-chloroethyldiethylamine hydrochloride for ten minutes. The fabric was dried in an air oven at 60° C. The fabric was then immersed in a 25% aqueous solution of NaCH for a period of 16 hours. The treated fabric, diethylaminoethylated cellulose, was washed in dilute acetic acid, tap water, distilled water, and ironed dry. A nitrogen content of 0.85 was obtained.

The fabric prepared as outlined in the preceding paragraph was soaked in 15% aqueous sodium hydroxide to 100% pickup. The soaked fabric was placed in undiluted 1–Cl 2,3-epithiopropane at 26° C. for a period of 8 hours. The fabric was washed with methanol, washed with distilled water and dried. The fabric contained 1.66% sulfur and 0.56% chlorine.

EXAMPLE 2

The process of Example 1, except that the temperature was 55° C. rather than 26° C. The fabric contained 3.14% sulfur and 0.98% chlorine.

EXAMPLE 3

The process of Example 1, except that the temperature was 100° C. and the reaction time was 1 hour. The fabric had a sulfur content of 2.80% and a chlorine content of 0.36%.

EXAMPLE 4

The process of Example 1, except that the reflux temperature was used rather than 26° C. and the time of reaction was one-half hour. The fabric had a sulfur content of 3.85% and a chlorine content of 0.48%.

EXAMPLE 5

A DEAE cotton fabric of 0.85% N content was padded in a 15% solution of NaOH in water to 100% takeup. The fabric was reacted with 10% by weight of 1–Cl 2,3-epithiopropane in octyl alcohol for one hour at 100° C. The fabric was completely immersed in liquid during the reaction. Upon completion of the reaction the fabric was removed from solution and thoroughly washed with water, dried, equilibrated and tested. The fabric had a sulfur content as SH of 3.9% and a chlorine content of only 0.16%. A control of the same procedure except using plain cotton rather than DEAE cotton added 1.55% sulfur and 0.07% chlorine illustrating that the DEAE cotton improves SH takeup considerably while keeping chlorine content low.

EXAMPLE 6

Example 5 except instead of padding the fabric with NaOH prior to reaction, NaOH was added to the epithioirane solution in octyl alcohol until the pH was slightly basic (8). The DEAE fabric had a sulfur content of 1.75 and a chlorine content of 1.25%. This illustrates the need for padding the fabric with NaOH prior to reaction to keep the chlorine content low.

EXAMPLE 7

Example 5 except that a DEAE cotton of 0.44% nitrogen was used instead of one with 0.85% nitrogen. The sulfur content of the finished fabric was 0.78% and the chlorine content 0.05%. This illustrates the low chlorine content compared to sulfur and the fact that the procedure can be used on a DEAE fabric of low nitrogen content even though its advantage over plain cotton is lost when the nitrogen value is less than 0.5%.

EXAMPLE 8

A DEAE fabric sample of 0.85% nitrogen was padded in 15% NaOH in water to 100% takeup. The fabric was placed in a mixture of 2 parts thiourea, 20 parts epichlorohydrin, 80 parts octyl alcohol and held at a temperature of 100° C. for one hour with agitation of the reactants. The fabric was washed, dried, equilibrated and tested. The fabric had a sulfur content of 0.93% as SH and 0.15% chlorine showing that the procedure works when the 1–Cl 2,3-epithiopropane is generated in situ rather than prepared previous to reaction as in Example 1.

EXAMPLE 9

Example 8 except KSCN substituted for thiourea. The fabric had a sulfur content of 0.43% and a chlorine content of 0.08% illustrating that KSCN may be used rather than thiourea when the 1–Cl 2,3-epithiopropane is generated in situ.

EXAMPLE 10

Example 8 repeated. The fabric had a sulfur content of 0.82% and a chlorine content of 0.02%. A plain cotton control had a sulfur content of 0.25% and a chlorine content of 0.09%. This illustrates that the in situ production of the epithioirane in octyl alcohol can be repeated and adds to DEAE cotton in greater degree than to plain cotton.

EXAMPLE 11

Example 5 except neat rather than in octyl alcohol. Fabric added 1.46% sulfur and 0.31% chlorine illustrating that the use of the claimed process adds almost three times as much sulfur and only half as much chlorine as when the epithioirane is used neat.

EXAMPLE 12

Example 11 except sample was not padded prior to reaction. Fabric added 0.94% sulfur and 0.62% chlorine illustrating the desirability of padding to keep the chlorine content down and increase sulfur content.

EXAMPLE 13

Example 5 except T-pentyl alcohol in place of octyl alcohol. The fabric contained 1.79% sulfur and 0.09% chlorine indicating that a different hindered alcohol than octyl alcohol can be used in the process.

EXAMPLE 14

The process of Example 3 was used to produce the new material which contains the sulfhydryl groups. The diethylaminoethylated cellulose containing the sulfhydryl groups was oxidized in a solution of 0.5% $KBrO_3$ in $H_2O$ for 24 hours at 26° C. which caused the dry crease angle to increase from 157 to 187. Reduction of the crosslinks by soaking the fabric in a 53.8% solution of ammonium thioglycolate in water decreased the dry crease angle from 187 to 162.

EXAMPLE 15

The process of Example 5 except that the new material containing sulfhydryl groups as produced in Example 4 was used. Oxidation to produce crosslinking raised the dry crease angle from 180 to 214. Subsequent reduction lowered the dry crease angle back to 187.

We claim:

1. A process for introducing sulfhydryl groups into a diethylaminoethyl cellulosic fabric which process comprises:
   (a) impregnating the diethylaminoethyl cellulosic fabric to 100% wet pickup with about a 15% by weight aqueous solution of sodium hydroxide,
   (b) reacting the impregnated fabric from step (a) with an excess of 1 - chloro - 2,3 - epithiopropane at a temperature from 20° C. to 100° C. for a time interval of from ½ hour to 8 hours, the shorter intervals being employed with the higher temperature and
   (c) subjecting the reacted fabric from step (b) first to a methanol wash and subsequently to a water wash to free the reacted fabric from unreacted 1-chloro-2,3-epithiopropane and from sodium hydroxide.

2. A process for introducing sulfhydryl groups into a diethylaminoethyl cellulosic fabric which process comprises:
   (a) impregnating the diethylaminoethyl cellulosic fabric to 100% wet pickup with about a 15% by weight aqueous solution of sodium hydroxide,
   (b) reacting the impregnated fabric from step (a) with about 10% by weight of 1–Cl 2,3-epithiopropane in a solvent selected from a group consisting of n-octyl alcohol and t-pentyl alcohol at a temperature from 20° C. to 100° C. for a time interval of from ½ hour to 8 hours, the shorter intervals employed with the higher temperature and
   (c) subjecting the reacted fabric from step (b) first to a methanol wash and subsequently to a water wash to free the reacted fabric from unreacted 1-chloro - 2,3 - epithiopropane and from sodium hydroxide.

3. A process for introducing sulfhydryl groups into a diethylaminoethyl cellulosic fabric which process comprises:
   (a) impregnating the diethylaminoethyl cellulosic fabric to a 100% wet pickup with about a 15% by weight aqueous solution of sodium hydroxide, (b) reacting the impregnated solution from step (a) with a mixture consisting of 20 parts epichlorohydrin, 80 parts octyl alcohol and 2 parts of a sulfur compound selected from a group consisting of thiourea and potassium thiocyanate at a temperature of about 100° C. for a period of about 1 hour and (c) subjecting the reacted fabric from step (b) first to a methanol wash and subsequently to a water wash to free the reacted fabric from unreacted reagents.

4. A process for introducing sulfhydryl groups into a diethylaminoethyl cellulosic fabric which process comprises:

(a) impregnating the diethylaminoethyl cellulosic fabric to 100% wet pickup in a solution containing about 10° by weight of 1-Cl 2,3 - epithiopropane in octyl alcohol and made slightly basic with sodium hydroxide at a temperature of 100° C. for a period of about one hour and (b) subjecting the reacted fabric from step (a) first to a methanol wash and subsequently to a water wash to free the reacted fabric from unreacted reagents.

References Cited

Schwenker et al.: Textile Research Journal, vol. 32, p. 797 (1962).

Schwenker et al.: Textile Research Journal, vol. 33, pp. 107–117 (1963).

Mack et al.: Textile Research Journal, vol. 35, pp. 353–364 (1965).

Hobart et al.: Textile Research Journal, vol. 36, pp. 30–37 (1966).

Soignet et al.: Journal of Applied Polymer Science, vol. 11, pp. 1155–1172 (1967).

Tesoro et al.: Journal of Applied Polymer Science, vol. 12, pp. 683–697 (1968).

GEORGE F. LESMES, Primary Examiner

J. CANNON, Assistant Examiner

U.S. Cl. X.R.

8—116.2, 129